Nov. 1, 1960  H. STANSFIELD ET AL  2,958,119
CUTTING TOOL
Filed Dec. 3, 1957  2 Sheets-Sheet 1
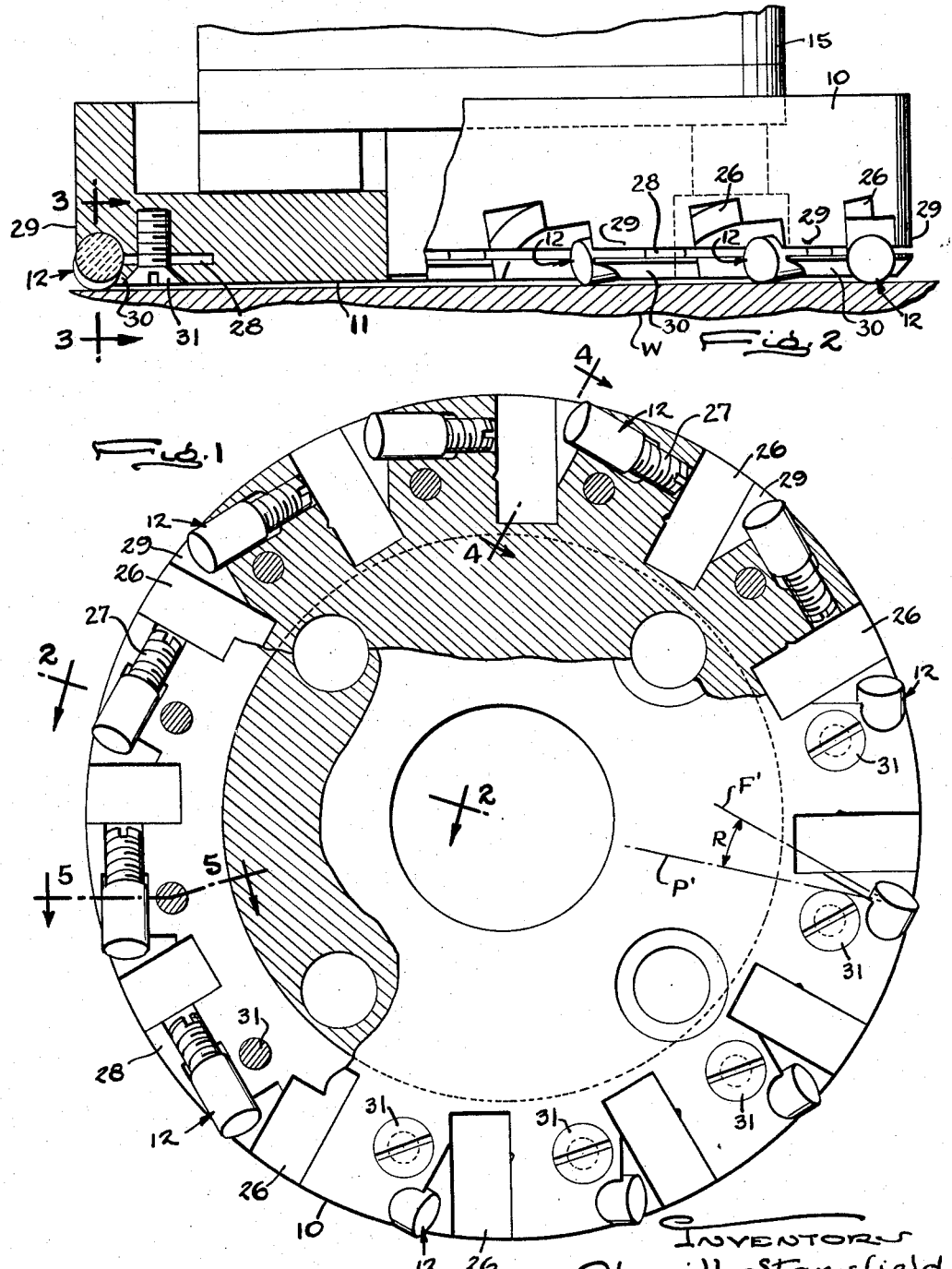
INVENTORS
Hamill Stansfield
James Edge
By Carlson, Pitzner, Hubbard & Wolfe
ATTORNEYS Nov. 1, 1960
H. STANSFIELD ET AL
2,958,119
CUTTING TOOL
Filed Dec. 3, 1957
2 Sheets-Sheet 2
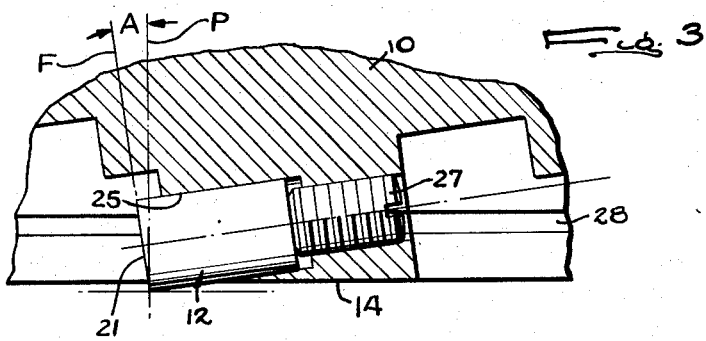
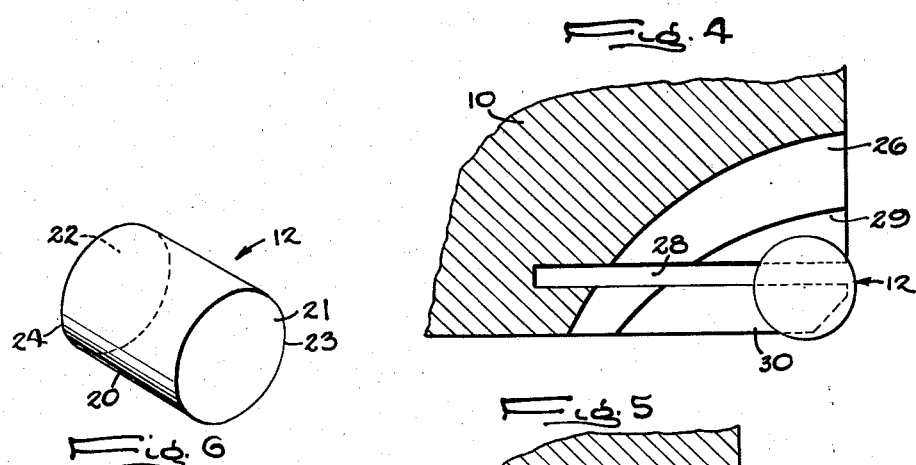
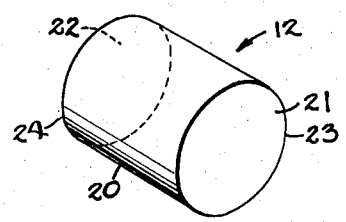
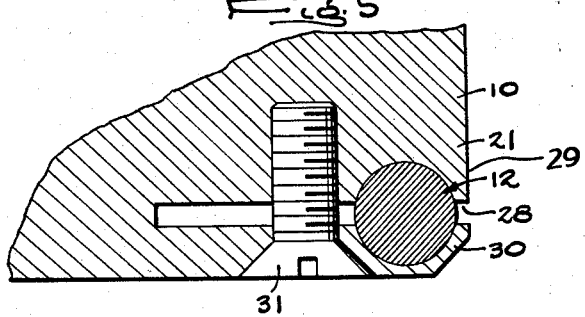
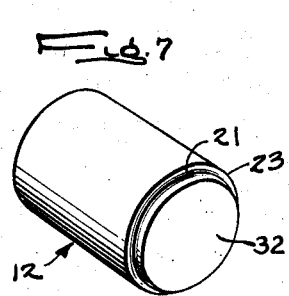
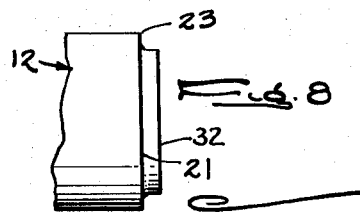
INVENTORS
Hamill Stansfield
James Edge
By Carlson, Pitzner, Hubbard & Wolfe
ATTORNEYS United States Patent Office 2,958,119
Patented Nov. 1, 1960

2,958,119
CUTTING TOOL

Hamill Stansfield and James Edge, Allentown, Pa., assignors to Carney-Stansfield Co., Allentown, Pa., a corporation of Pennsylvania Filed Dec. 3, 1957, Ser. No. 700,380

2 Claims. (Cl. 29—105)

The invention relates generally to metal cutting tools and more particularly to face mills of the inserted tooth type.

One object of the present invention is to provide an improved metal cutting tool of the face mill inserted tooth type having versatile and renewable cutter teeth inserts which are useful for machining many different types of metals with a wide range of speeds and feeds.

Another object of the present invention is to provide an improved cutting tool of the foregoing character in which the inserted cutter teeth are so disposed with respect to the axis of rotation of the mill as to be under compression during the cutting operation and in which an inserted tooth can be easily adjusted or replaced as it becomes worn.

A further object of the present invention is to provide a face mill having the foregoing characteristics and in which the cutting edge of an inserted tooth can be renewed without grinding and further in which means are provided for accurately maintaining and adjusting the position of the inserted teeth.

Still another object of the present invention is to provide an improved mill of the above type in which the inserted teeth are held tightly, rigidly, and positively against the tool holder body and in which cutting forces on the inserted teeth are absorbed directly by the holder body.

Other objects and advantages of the present invention will become apparent from the following detailed description, taken in connection with the accompanying drawings in which:

Figure 1 is a bottom plan view, partly in section, of an illustrative milling cutter embodying the present invention.

Fig. 2 is an elevation view of the milling cutter shown in Fig. 1 and having a portion thereof shown in a section taken substantially in the plane of line 2—2 of Fig. 1.

Fig. 3 is a fragmentary section view taken substantially in the plane of line 3—3 of Fig. 1 and showing an inserted tooth and adjusting screw.

Fig. 4 is a fragmentary section view taken substantially in the plane of line 4—4 of Fig. 1 and showing the front elevation of a cutting tooth and the chip clearance space of the mill.

Fig. 5 is a fragmentary section view taken substantially in the plane of line 5—5 of Fig. 1 and showing one means for clamping an inserted cutting tooth in the mill.

Fig. 6 is an enlarged isometric view of a cutter tooth employed in the present invention.

Fig. 7 is an enlarged isometric view of a cutter tooth similar to that shown in Fig. 6 but having a chip breaker integrally formed thereon.

Fig. 8 is an elevation view of the cutting tooth shown in Fig. 7.

While the invention is susceptible of various modifications and alternative constructions, a certain illustrative face mill has been shown in the drawings and will be described below in detail. It should be understood, however, that there is no intention to limit this invention to the specific form disclosed, but, on the contrary, the intention is to cover all modifications, alternative constructions, equivalents and uses falling within the spirit and scope of the invention as expressed in the appended claims.

Referring to Figs. 1 and 2, the mill shown there as an illustration of the present invention comprises a generally cylindrical cutting tool holder 10 formed from a cylindrical block of steel or other suitable material of the type commonly used in mills. Disposed peripherally around the lower face 11 of the holder are a plurality of cutting tool inserts 12, otherwise known as cutters or teeth. The cutters 12 project radially and axially outward from the tool holder 10 and are held in this position by suitable clamping means, to be described later.

The mill shown in Figs. 1 and 2 is adapted to be mounted in a spindle of a milling machine (not shown). To this end the holder 10 is formed with a shank 15 which can be inserted in a suitable aperture in the spindle. Means such as a drawbolt or Morse taper (not shown) are provided for attaching the shank 15 to the spindle. When presented to a workpiece W, as shown in Fig. 2, the cutters 12 held in the face mill bite into the workpiece surface to remove a predetermined amount of metal therefrom. This cutting operation leaves a machined surface on the workpiece, the smoothness and flatness of which depends primarily on the speed, feed, and depth of cut of the mill.

The tool inserts or cutters 12 shown in Figs. 6, 7 and 8, comprise generally cylindrical elements preferably formed of a hard ceramic cutting tool material. One such ceramic material is known in the machine tool industry as "Sintox." Cutter inserts formed of ceramic materials such as "Sintox" are extremely long-wearing and durable, and are desirably used where tool wear is an important factor. Further, inserts made of "Sintox" can be molded to the final shape desired, thereby eliminating arduous and time-consuming grinding operations on the extremely hard material in order to shape the inserts for use in cutting tools. The ceramic material, such as "Sintox," is formed of hard, oxide materials sintered to shape with suitable bonding elements. When sintered as a dense whole, the inserts have a hardness greater than that of carbides which are commonly used for cutting tool materials. Although the ceramic tool inserts are extremely hard and long-wearing, they are quite brittle and must, therefore, be held tightly within a tool holder so that cutting forces are substantially compressive in nature and are transmitted directly to the holder.

The tool inserts employed in the holder illustrative of the present invention are desirably formed of a ceramic cutting tool material such as "Sintox" and are shaped in the form of a right cylindrical element 20 having opposed faces 21, 22 bounded by cutting edges 23, 24 respectively (Fig. 6). During a machining operation on a workpiece, only a portion of one edge of the tool insert 12 performs the actual cutting operation. The edges 23, 24 extend around the entire periphery of the cutting face and, accordingly, the tool insert is rotatable in the holder to present a fresh cutting edge to the workpiece when an old edge has become worn. Although the tool insert shown in Fig. 6 is circular in cross-section, it should be understood that tool inserts which are triangular or rectangular in cross-section may be used to advantage depending upon the particular application for which they are adapted.

The holder 10 includes means for receiving the cutting tool inserts 12 and for tightly and rigidly holding the same during machining operations. One means for accomplishing this comprises a plurality of recesses 25 which are secantially spaced around the periphery of the holder face 11. By inclining each recess relative to the axis of rotation of the holder the desired rake angles can be achieved when the tool insert 12 is mounted in the holder 10. Rake angles, as used herein, are generally defined as those angles made between the lines of intersection with a particular rake angle plane of the plane of the tooth face and a reference plane. The reference plane is established as that plane containing the axis of rotation of the tool holder. Two rake angles are generally determined in the design of a tool insert and these rake angles are referred to as the axial rake angle and the radial rake angle. The axial rake angle is defined as the angle lying in a plane, known as the axial rake plane, which is perpendicular to the machined surface, and between the lines of intersection of the reference plane and the tooth face plane with the axial rake plane. The radial rake plane is the plane of the machine surface. Thus, the radial rake angle is defined as that angle lying in the radial rake plane between the lines of intersection of the reference plane and the tooth face plane with the radial rake plane. A rake angle is further defined as a negative angle if it falls in front of the reference plane, or in other words, if it is spaced from the reference plane in the direction of rotation of the mill. Conversely, the rake angle is defined as positive if it falls behind the reference plane.

The axial rake angle of the mill teeth is shown as the angle A in Fig. 3 included between the line of intersection P of the reference plane with the axial rake plane and the line of intersection F of the tooth face plane with the axial rake plane. The radial rake angle is shown as the angle R in Fig. 1 included between the line of intersection P' of the reference plane with the radial rake plane and the line of intersection F' of the tooth face plane with the radial rake plane. Because the tool face is inclined upwardly and forward in the direction of rotation of the cutting tool, the axial rake angle A is negative. Similarly, because of the secantial disposition of the tool insert in the tool holder with the tool inclined out and rearward, the radial rake angle B is negative.

As an illustration of a tool holder 10 constructed in accordance with the present invention, a mill 7″ in diameter is provided with twelve teeth or cutter inserts 12 of "Sintox" ceramic material. Each insert is a right cylinder ⅜ of an inch in diameter. The inserts are mounted in the mill so as to present an axial rake angle (A) of —7½° and a radial rake angle (R) of —15°.

The tool insert 12, being a right cylinder, the axial rake angle A (Fig. 3) is equal to the angle of intersection of the longitudinal axis of the tool insert, and thus of the recess 25 with the plane of the tool holder face 11. The use of tool inserts which are right cylinders is particularly desirable because as one portion of the cutting periphery wears, it is a simple matter to loosen the insert in the holder and rotate it in order to present a new cutting edge to the workpiece. The difficult task of accurately machining the cutting edge of the inserts is thereby prevented and the useful life of the tool insert is increased. Even more desirably, when the entire cutting periphery of the insert has been worn, the insert can be economically discarded and no attempt need be made to machine it to provide a fresh cutting edge.

Provision is made for adjusting the depth of the recess 25 in which the tool insert 12 is held. This is accomplished by a threaded set screw 27 projecting into the recess and threaded through the holder so as to be movable with respect to the bottom of the recess 25. The threads of the set screw 27 and the holder 10 are sufficiently fine to afford a precise adjustment of the set screw. With this construction the projection of the cutting tooth or tool insert 12 with respect to the face 14 of the holder 10 can be accurately set.

In order to prevent chips or strips of metal from jamming between the cutting face 21 of the tool 12, the work holder face 11, and the workpiece W as they are removed during a cutting operation, a chip clearance space 26 is provided in the tool holder. This space 26 not only serves for chip clearance but also affords access to the adjustment or set screw 27 when it is desired to change the projection of a tool insert from the holder.

Means are provided for clamping the tool inserts 12 in the holder 10. One means for accomplishing this is formed by a radially extending slot 28 intersecting the tool recess 25 so as to define upper and lower jaws 29, 30, respectively. The lower jaw 30, which serves as the clamping means for the tool inserts, is deformable with respect to the upper jaw 29, which is actually the holder body. In this manner the tool insert is substantially completely surrounded by a rigid nondeformable supporting wall 29 of the holder and is held tightly in a fixed position against the main body of the tool holder 10 when the clamping jaw 30 is deformed into clamping engagement with the insert. To deform the lower jaw 30 for clamping the insert 12 in the holder, a clamping screw 31 rotatably extends through the lower jaw 30 and is threadably engaged with the upper face 29 of the holder. Rotation of the clamping screw in one direction deforms the lower jaw 30 upwardly into clamping engagement with the tool insert. If desired, the slot 28 can extend annularly around the cutter holder 10. Each individual lower jaw 30 is then defined by the chip clearance slots 26 on each side of the tool insert recess 25.

With the foregoing construction, the ceramic tool insert is held tightly in the holder under maximum compression so that impact stresses during the use of the tool are transmitted directly through the insert to the holder. Only the lower jaw 30 is deformed to clampingly engage the tool insert, and this particular jaw does not serve to absorb any of the thrust exerted on the cutter teeth during a cutting opertaion. The tooth mounting is thus extremely rigid. The tool insert 12 and the recess 17 in the tool holder 10 in which the tool insert is held are complementally shaped and the recess 17 is dimensioned to receive the insert with a snug fit. The cutting of the clamping slot 28 through the tool receiving recess 17 and the recess containing the adjusting screw affords a desirable clamping action when the clamping screw 31 is tightened. As a result, both the tool insert 12 and the adjusting screw 18 are tightly held and movement of either one is precluded during operation of the tool.

Furthermore, the fact that the inserted teeth are positively and rigidly supported in the holder body permits the recesses to be accurately dimensioned and located with respect to the holder and thus with respect to the machine tool spindle in which the mill is held. Greater accuracy in machining operations is possible when the tooth insert recesses are accurately located because errors in mounting the tool insert in the holder are avoided. As an additional advantage, the tool inserts may be adjusted in their respective recesses to provide a fresh cutting edge 23 as one portion becomes worn. With a mill constructed in accordance with the present invention, it is a simple matter to loosen the clamping screw 31 and rotate the cutting tool insert 12 in the accurate recess and about its longitudinal axis a small amount. This presents a fresh cutting edge of the tool to the workpiece without disturbing the setting or adjustment of the teeth in the holder.

In a similar manner, when the entire periphery 23 of the cutting face 21 has become worn, it is easy to replace an entire tool insert. To do this, the clamping screw 31 is removed and the entire tool insert 12 can be replaced. If desired, the tooth 12 need only be turned end for end whereby the opposite face 22 becomes the cutting face and an entirely new cutting edge 24 is presented for use. The insert is replaced in the tool holder by first making sure the recess 17 is clean and then by tapping the end 22 of the insert to be sure it is seated against the adjusting screw 18. The clamping screw 31 is then tightened and the mill is ready for use. Because the cutting tool insert is a right cylinder and of a standard length, no further adjustments of the holder are necessary when the cutting edge is renewed. Accordingly, the original dimensions of the tool are maintained with each renewal of the cutting edge and since all faces of the tool insert are the same, its useful life is materially increased.

As an added advantage to the use of ceramic tool inserts for the above applications, the ceramic tool inserts are supplied to uniform standard dimensions. Therefore, if one insert should break, it is easily replaced with a new insert having the same dimensions. This advantage results in a considerable reduction in the time and effort ordinarily required for readjusting a cutting tool when one tool insert is replaced.

As a further desirable advantage of the present invention, particularly where the metal to be machined is of the type which forms long and dangerous chips, the tool inserts are desirably formed with a chip breaker 32 on each tool face 21, 22. The tool insert 12 being a cylinder, the chip breaker 26 is symmetrical and is shaped as a projection from the tooth face 21 and of a reduced diameter. Material removed by the cutting edges of the tool from the workpiece is deflected from its normal path by the ship breaker 32 and is broken into chips for convenient disposal. Furthermore, the tool insert having the chip breaker may be rotated and turned end for end to renew its cutting surface with the same desirable advantages described above.

It will be apparent from the foregoing description that there has been provided an improved metal cutting tool of novel and advantageous construction. The novel manner of mounting the tool inserts in the tool holder greatly facilitates the renewal of the cutting and increases the life of the tool insert. The tool inserts are desirably formed of a hard ceramic material such as "Sintox" and are held in the tool holder so as to be subjected mainly to compressive forces during cutting operation. The mounting of the inserts in the improved tool holder permits of axial adjustment of the insert by the simple expedient of an adjusting screw. Furthermore the mounting is exceptionally rigid and positive to ensure accuracy in locating the teeth in the mill and uniformity in its cutting operation. With the foregoing construction, cutting forces are absorbed directly by the mass of the holder. More accurate machining at higher speeds and feeds is thus possible with the improved mill embodying the present invention.

We claim as our invention:

1. A rotary metal cutting tool of the ceramic insertable tooth face mill type, comprising a cylindrical body having a lower face with the axis of rotation of said body extending perpendicular to said face, said body having a plurality of uniformly spaced recesses of constant polygonal cross section opening into said lower face and extending secantially in said holder, said body further having an axial and substantially radially extending chip clearance space intersecting each recess and opening into the lower marginal portions of said body, means defining a peripheral slot in said holder adjacent said lower face splitting said recesses and intersecting said clearance spaces to define deformable jaws on the lower face side of said slot and rigid jaws on the body opposed thereto, polygonal ceramic inserts of right prism form inserted in said recesses and means deforming said deformable jaws and clamping said inserts in said recesses, the secantial extension of the said recesses being such with relation to said axis that the said right prism inserts are provided with negative axial and radial rake and the forces imposed thereon during cutting operation are compressive forces.

2. The rotary metal cutting tool of claim 1 wherein the said polygonal inserts are cylindrical in form, the said negative radial and axial rake angles are respectively 15° and 7½°, and an adjustment means backs up the said insert for axial extension thereof from said recess.

References Cited in the file of this patent

UNITED STATES PATENTS

| | | |
|---|---|---|
| 1,460,029 | Mattson | June 26, 1923 |
| 2,327,944 | Toubhaus | Aug. 24, 1943 |
| 2,328,493 | Reaney | Aug. 31, 1943 |
| 2,418,734 | Steffes | Apr. 8, 1947 |
| 2,630,725 | Black | Mar. 10, 1953 |
| 2,648,893 | Begle | Aug. 18, 1953 |
| 2,690,610 | Begle | Oct. 5, 1954 |
| 2,770,028 | Bonnafe | Nov. 13, 1956 |
| 2,773,407 | Staples | Dec. 11, 1957 |
| 2,823,447 | Doerseln | Feb. 18, 1958 |